March 22, 1932. A. D. ILIOVICI 1,850,324

PHASE METER FOR POLYPHASE CURRENTS

Filed May 5, 1930

Inventor
Avram D. Iliovici
by Wilkinson & Mawhinney
Attorneys.

Patented Mar. 22, 1932

1,850,324

UNITED STATES PATENT OFFICE

AVRAM DAVID ILIOVICI, OF PARIS, FRANCE, ASSIGNOR TO COMPAGNIE POUR LA FABRICATION DES COMPTEURS ET MATERIEL D'USINES A GAZ, OF MONTROUGE, SEINE, FRANCE, A JOINT-STOCK COMPANY OF FRANCE

PHASE METER FOR POLYPHASE CURRENTS

Application filed May 5, 1930, Serial No. 449,982, and in France May 6, 1929.

Phase meters with rotating iron armatures are constructed for two-phase or three-phase circuits, wherein the iron portion is Z-shaped with the web practically parallel to the axis of rotation of the movable pointer, while the arms are perpendicular to the axis. The armature is magnetized by a fixed coil the axis of which coincides with that of the pointer, while through its winding there flows a current generally proportional to one of the voltages of the circuit the power factor, cos $\phi$, of which is to be measured. Moreover, a radial rotating magnetic field is produced by two other coils, in the case of two-phase circuits, or three in the case of three-phase circuits, making between them angles of $\pi/2$ or $2\pi/3$ respectively and through which flow generally the circuit currents or currents proportional thereto.

The action of this field on the magnetized iron armature makes it take up a position which depends on the cos $\phi$.

This type of phase meter presents the advantage of allowing a scale deflection of 360° and a reduction of the mechanical friction torque which may be made absolutely negligible especially as the pointer may be made much lighter than that of the other types of phase meters.

But the apparatus thus designed, as is the case with the majority of existing phase meters, is only suitable when the voltages and currents are balanced.

It is well known that the voltages are practically balanced whereas the currents generally are not; in this case, the apparatus gives a badly defined cos $\phi$.

If the coil magnetizing the iron be fed with one of the currents of the circuit and the other coils with currents proportional to and in phase with the voltages, the phase meter measures the phase displacement of the current utilized relatively to the corresponding voltage or relative to another suitable voltage.

But it is possible to construct a phase meter measuring the mean cos $\phi$ of a two-phase or three-phase circuit with two or three rotating armatures secured together and a suitable number of fixed coils. A solution of this problem has been indicated in French Patent No. 597,582 dated May 4th, 1925 (Fig. 4).

The present invention is directed to a simpler solution using a rotating pointer with two or three armatures each magnetized by a suitable coil, the unit formed by the armatures moving through a single magnetic field produced by two or three suitably fixed coils.

When the phase meter is to be used to measure the mean cos $\phi$ of a two-phase circuit, the apparatus may include two armatures magnetized by two coils traversed by currents proportional to the voltages and moving in the magnetic field produced by two practically identical coils from the electric point of view, said coils through which flow the currents, having their axes mutually perpendicular and perpendicular to the axis of rotation of the armatures.

In a three-phase circuit, there may be used three movable armatures secured together, and magnetized by three practically identical coils through which flow currents proportional to three voltages of the three-phase system, said armatures moving in the magnetic field produced by three practically identical coils whose axes which are perpendicular to the axis of rotation of the movable pointer form between them angles of 120°. The three currents of the circuits or currents proportional thereto may flow through said coils.

The number of armatures may be reduced to two as also the number of coils magnetizing them, by converting the three-phase voltage system into a two-phase system by means of transformers, or Scott auto-transformers or other equivalent devices.

Likewise, the number of field producing coils may be reduced to two, by converting the system of three-phase currents into an equivalent two-phase system.

On the contrary, in order to secure a uniform scale for the apparatus, it may be advisable to multiply the number of coils by producing a winding similar to the stator of an induction motor.

Instead of causing currents proportional to the voltages to flow through the coils for magnetizing the armatures, currents equal or proportional to those of the circuit whose cos φ is being measured, may be passed through said coils, and, on the other hand, currents proportional to the voltages may be passed in the coils which produce the field which reacts on the armatures.

The invention has been illustrated by way of example in the following drawings where-in:

Figure 1:
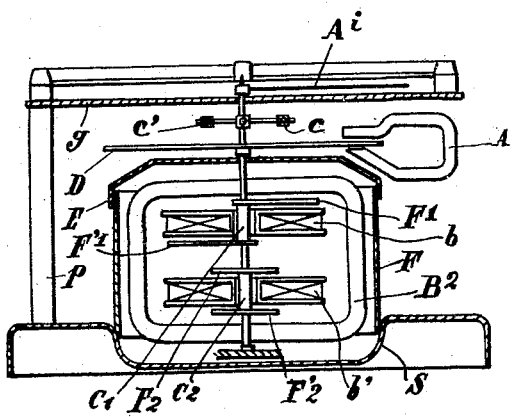
Fig. 1 illustrates the phase meter according to the invention in sectional elevation.
Figure 3:
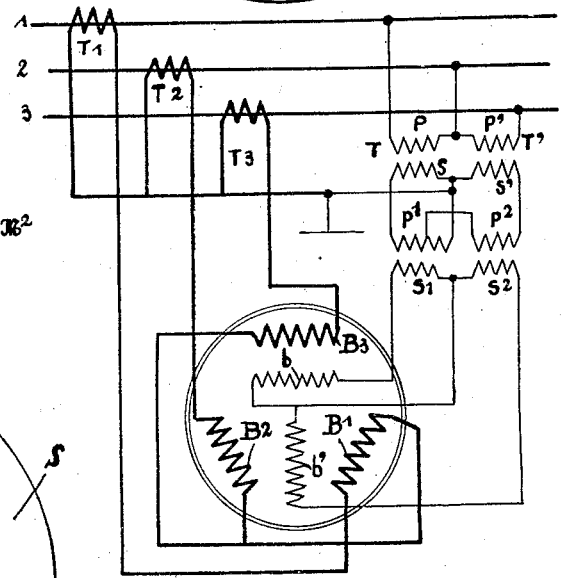
Fig. 3 shows a circuit arrangement for the wiring of the phase meter.
Figure 2:
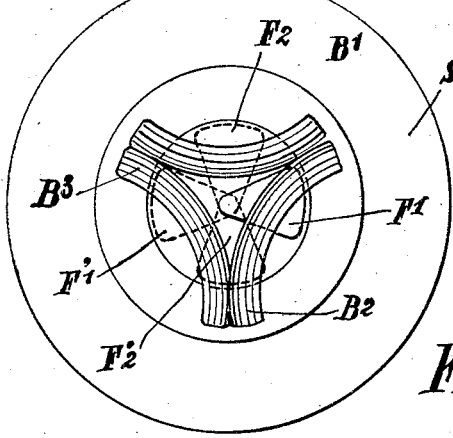
Fig. 2 is a plan view of the phase meter illustrated in Fig. 1.

The phase meter of Figs. 1 and 2 has two armatures at right-angles which are magnetized by two coils through which flow currents proportional to two two-phase voltages obtained, as shown in Fig. 3, by means of a Scott device; the magnetic field through which the armatures move being obtained by means of three coils traversed by the currents.

In these Figures, $F_1$, $F'_1$ and $F_2$, $F'_2$ are the vanes of the two armatures, the webs of which are formed by iron tubes $C_1$ and $C_2$ surrounding the axis of the movable pointer; the armatures $F_1$, $C_1$, $F'_1$ and $F_2$, $C_2$, $F'_2$ are magnetized by the coils $b$, $b'$ through which two suitable alternating currents are caused to flow. It will be assumed that the virtual values of these currents are proportional to the common virtual value of the voltages of the circuit, the phase displacement of which it is desired to measure. Under the action of these currents, the armatures $F_1$, $C_1$, $F'_1$, $F_2$, $C_2$, $F'_2$ receive alternating magnetization.

$B_1$, $B_2$, $B_3$, are three coils of a three-phase system through which flow the three currents of the three-phase circuit, the cos φ of which it is desired to measure (or by three proportional currents obtained by means of current transformers). Said coils produce in the space in which the armatures move a radial rotating magnetic field which acting on the armatures causes them to take up a resultant position which, as will be seen presently, depends on the phase displacements between the currents in the aforementioned coils $b$, $b'$, and the currents in the coils $B_1$, $B_2$, $B_3$. D is a metallic disc (generally copper or aluminium) moving in the air gap of one or several permanent magnets A, and the purpose of which is to damp the oscillation of the movable system; $A_1$ is the pointer of the phase meter moving over the graduated dial $g$; $c$, $c'$ are balance weights which serve to balance the movable system; S is the base of the apparatus, $p$ posts serving to support the dial and the lid; E and F are soft iron members surrounding the phase meter in order to reduce the effect of the outer magnetic fields and, in particular, those of the magnets A on the operating parts of the apparatus and in particular the movable armatures. The member E may, for example, have the form of a basin while F has the form of a cylindrical tube.

Fig. 3 shows the phase meter forming the object of the invention wired to a three-phase circuit. In this figure the phase meter outlined by the circle in double lines, comprises the coils $b$, $b'$ which magnetize the movable armatures and the coils $B_1$, $B_2$, $B_3$, which produce the rotating magnetic field which acts on the movable armatures to give them a fixed position for each value of the power factor (cos φ). T, T' are two voltage transformers; the primaries $p$, $p'$, of which are fed by two delta voltages (line voltages) of the circuit 1, 2, 3. $p_1$, $p_2$ and $s_1$, $s_2$ are the primaries and secondaries respectively of a Scott device $S_c$, which serve to convert the three-phase voltage system into an equivalent two-phase system for feeding the coils $b$, $b'$. $T_1$, $T_2$, $T_3$ are three current transformers which cause currents proportional to and practically in phase with the currents in the wires, 1, 2 and 3 to flow through the coils $B_1$, $B_2$, $B_3$.

Figure 4:
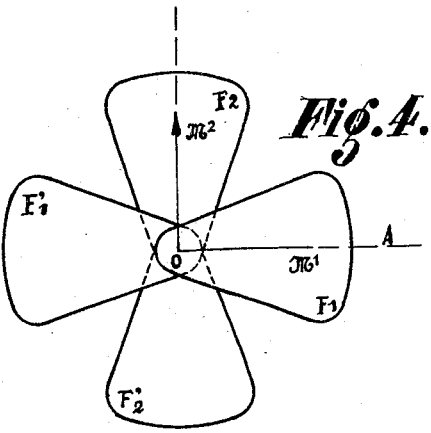
Figs. 4 to 7 are vector diagrams explanatory of the operation of the phase meter.

The operation of the phase meter will be readily understood. The alternating currents which flow through the coils $b$, $b'$ (Figs. 1 and 3) magnetize the movable iron vanes giving them alternating magnetizations. The mean direction of the lines of force in the vanes (for example $F_1$, $F'_1$) coincides with the axes of said vanes; each movable armature is equivalent to a magnet, the magnetic moment of which ($M_1$ for the armature, $F_1$, $C_1$, $F'_1$ and $M_2$ for the armature $F_2$, $C_2$, $F'_2$) is perpendicular to the axis of rotation and is parallel to the axis of the two vanes which form the armature under consideration. Thus, for example, for the armature $F_1$, $C_1$, $F'_1$, the magnetic moment is represented in Fig. 4 by $M_1$; said moment is proportional, moreover, to the current $i'_1$, in the coil $b$, hence to the voltage $v'_1$ at the terminals of said coil. If the reactance of the coil $b$ is negligible in comparison with its resistance, $i'_1$ and hence $M_1$, is in phase with $v_1$ and therefore:

$$M_1 = kv_1$$
or $\qquad M_1 = Mm_1 \sin \omega t \quad (1)$ $Mm_1$ being proportional to the virtual value of the voltage $v_1$.

Similarly in the case of the moment $M_2$ of the armature $F_2$, $C_2$, $F'_2$ $$M_2 = Mm_2 \cos \omega t \quad (2)$$

said moment being in the direction of the axis of the armature (Fig. 4) in phase with the voltage $v_2$ at the terminals of the coil $b'$ and the maximum value $Mm_2$ of which is proportional to the virtual value of the voltage $v'_2$.

If the system of voltages at the terminals of the three-phase circuit is balanced, the two voltages $v'_1$ and $v'_2$ formed by the Scott device $S_c$ have the same virtual value which is proportional to the virtual value V of the voltages of the three-phase system. Moreover, the voltage $v_2$ is in phase with the phase voltage of the third phase. The coils $b$, $b'$ and the armatures being identical, the values $Mm_1$ and $Mm_2$ are equal and their known value M is proportional to V; hence:

$$M_1 = kV \sin \omega t \quad (1')$$

$$M_2 = kV \cos \omega t \quad (2')$$

and $M_2$ being moreover in phase, and hence $M_1$ in quadrature, with the voltage of the third phase of the three-phase circuit in question.

Figure 5:
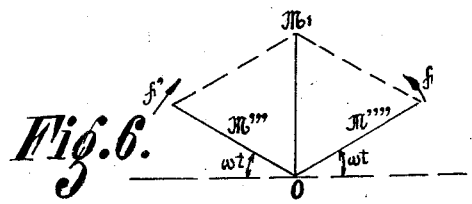

But the diagram of Fig. 5 shows that the alternating magnetic moment $M_2$ may be considered as resulting from two magnetic moments M′ and M″ of constant numerical value:

$$\frac{Mm}{2} = \frac{k}{2} \cdot V$$

rotating in contrary directions at angular velocity $\omega$, M′ being the component of the moment rotating in the direction of the arrow $f$, and M″ the one which rotates in the direction $f'$.

Figures 6, 7:
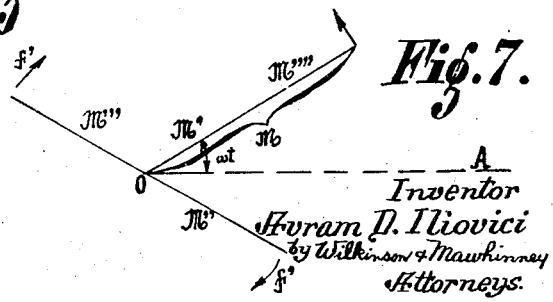

Similarly, the diagram of Fig. 6 shows that the moment $M_1$ may be resolved into two moments M‴ and M⁗, similar to the preceding ones.

The two magnetized armatures being connected together may be replaced by a single magnetized armature, the magnetic moment of which is the resultant of the two moments $M_1$, $M_2$ or of the four moments M′, M″, M‴ and M⁗ into which the first are resolved. It will be seen immediately from Fig. 7 that the value of the resultant moment is:

$$M = M' + M'' = Mm = kV$$

and that it rotates at angular velocity $\omega$ in the direction of the arrow $f$.

The preceding remarks may be interpreted as follows:—

The group of armatures $F_1$, $C_1$, $F'_1$ and $F_2$, $C_2$, $F'_2$ magnetized by the alternating currents of the coils $b$, $b'$ is equivalent to a magnet of constant magnetic moment $$M = kV,$$

but which rotates relatively to the armatures at constant angular velocity in the direction of the arrow $f$ (Fig. 7). The axis of said magnet equivalent to the magnetized armatures has moreover at the instant $t=0$ the direction of the axis OA of the vanes $F_1$, $F'_1$ (Figs. 4 and 7).

This being so, it will be assumed for the moment that the currents in the three phases 1, 2, 3 of the circuit form a balanced system. On flowing through the coils $B_1$, $B_2$, $B_3$ (Figs. 2 and 3) said currents produce a magnetic field rotating uniformly about the axis of rotation of the movable system and the lines of force of which are perpendicular to said axis. The connections may be made so that said field rotates in the same direction as the aforementioned magnet M.

Moreover the strength H of the field is given by:

$$H = k'I,$$

$I$ being the virtual value of one of the currents of the three-phase circuit. It is known moreover, that the direction of the field H is that of the axis of one of the coils, for example of the coil $B_3$, when the current in said coil is a maximum.

If the current in the coil $B_3$ lags by an angle $\varphi$ on the voltage of the same phase, it can be expressed by the relation:

$$i''_3 = I'_3 \cos(\omega t - \varphi)$$

and will therefore pass through its maximum at the instant $$\left(\frac{\varphi}{\omega}\right).$$

It therefore follows that at the instant $$t_1 = \frac{\varphi}{\omega},$$

the rotating field H will be in the direction of the axis of the coil $B_3$ and, at the instant $t=0$ it is displaced relatively to this position by the angle $\varphi$.

There is finally obtained a field H and a magnet M rotating in the same direction at the same speed $\omega$; the magnet having no resisting torque to overcome (neglecting the friction of the armatures) sets in the direction of the field. Now the position of the first at the instant $t=0$ being that of the axis of the vane F, and the field being displaced by $\varphi$ relatively to the axis of the coil $B_3$, the result is that the axis of the vane $F_1$ makes an angle $\varphi$ with the axis of the coil $B_3$. Hence the apparatus measures the phase displacement of the circuit.

Assuming now that the currents $i_1$, $i_2$, $i_3$, in the circuit are unbalanced while the voltages remain balanced, then in this case the positive phase sequence components of the currents give a field rotating in the same direction as in the preceding case and said field acts on the armatures as in the preceding case.

Moreover, the system of negative phase sequence components of the currents gives a field rotating in the opposite direction to the magnet equivalent to the armatures. Now when a field rotates at uniform speed relatively to a magnet, it produces thereon a zero mean torque.

To sum up, in the case of unbalanced currents, the system of the positive phase sequence components alone acts on the magnetized armatures and therefore forces the latter to take up a position which depends on the phase displacement $\varphi_d$ between said system and the system of the three-phase voltages.

I claim:

1. In a phase meter for measuring the power factor of a polyphase circuit whether balanced or unbalanced, the combination of at least two Z-shaped movable magnetizable elements secured together, a set of coils for magnetizing said elements, a single set of coils for producing a rotating magnetic field in which all said elements move, said two sets of coils being fed respectively with the currents and voltages of the polyphase circuit.

2. In a phase meter for measuring the power factor of a polyphase circuit whether balanced or unbalanced, the combination of at least two Z-shaped movable magnetizable elements secured together and displaced through ninety degrees, a set of coils for magnetizing said elements, a single set of coils for producing a rotating magnetic field in which all said elements move, said two sets of coils being fed respectively with the currents and voltages of the polyphase circuit.

3. In a phase meter for measuring the power factor of a three-phase circuit whether balanced or unbalanced, the combination of at least two Z-shaped movable magnetizable elements secured together, a set of coils for magnetizing said elements, a single set of coils for producing a rotating magnetic field in which all said elements move, and means for converting one of the two three-phase systems, voltages and currents, of said three-phase circuit into two-phase and feeding the same to one of said sets of coils, the other set of coils being fed from the other unconverted three-phase system.

4. In a phase meter for measuring the power factor of a three-phase circuit whether balanced or unbalanced, the combination of at least two Z-shaped movable magnetizable elements secured together and displaced through ninety degrees, a set of coils for magnetizing said elements, a single set of coils for producing a rotating magnetic field in which all said elements move, and means for converting one of the two three-phase systems, voltages and currents, of said three-phase circuit into two-phase and feeding the same to one of said sets of coils, the other set of coils being fed from the other unconverted three-phase system.

AVRAM DAVID ILIOVICI.